US005703351A

United States Patent [19]
Meyers

[11] Patent Number: 5,703,351
[45] Date of Patent: Dec. 30, 1997

[54] AUTOFOCUS MODULE HAVING A DIFFRACTIVELY ACHROMATIZED TOROIDAL LENS

[75] Inventor: Mark M. Meyers, Hamlin, N.Y.

[73] Assignee: Eastman Kodak Company, Rochester, N.Y.

[21] Appl. No.: 748,729

[22] Filed: Nov. 18, 1996

[51] Int. Cl.$^6$ ............................................. G01J 1/20
[52] U.S. Cl. ............................ 250/201.2; 250/201.8; 356/4.06; 396/80
[58] Field of Search ........................... 250/201.2, 201.4, 250/201.8, 208.1, 216, 201.6; 359/207, 711; 356/4.01, 4.03, 141.1, 141.2, 4.06; 396/79, 80, 82, 120, 121

[56] References Cited

U.S. PATENT DOCUMENTS

| | | | |
|---|---|---|---|
| 4,496,832 | 1/1985 | Sakai et al. | 250/201.2 |
| 5,006,700 | 4/1991 | Kosaka et al. | 250/201.4 |
| 5,471,046 | 11/1995 | Meyers | 250/201.7 |
| 5,569,904 | 10/1996 | Meyers | 250/201.8 |

FOREIGN PATENT DOCUMENTS

HEI8-107194  10/1994  Japan.

*Primary Examiner*—Que Le
*Attorney, Agent, or Firm*—Edward Dugas

[57] ABSTRACT

An autofocus module generates a beam of light that is divergent in the horizontal direction and collimated in the vertical direction. The beam is formed using a laser diode and a diffractively achromatized toroidal lens. A pair of receiver lenses which have focal lengths that are longer and shorter than the distance to a photodetector plane are positioned to receive the beam reflecting from an object. A pair of photodetectors, positioned at the photodetector plane, each providing an output signal that is indicative of the amount of light received by a associated receiving lens. The difference in the output signals is a function of the distance of the object from the detector plane and may be used to drive a camera lens to a desired focus position or to provide an indication of the object from the module.

18 Claims, 9 Drawing Sheets

AUTOFOCUS MODULE HAVING A DIFFRACTIVELY ACHROMATIZED TOROIDAL LENS

CROSS-REFERENCE TO RELATED APPLICATIONS

The present application is related to U.S. Pat. No. 5,471, 046, entitled "Camera Auto-Focusing System With Designator Using A Volume Hologram," and U.S. Pat. No. 5,569, 904, entitled "Multispot Autofocus System Usable With An Image Recording Apparatus," both by Mark M. Meyers.

FIELD OF THE INVENTION

This invention relates generally to the field of automatic focusing or rangefinding devices and more specifically to an electro-optical device which provides signals as a function of object distance.

BACKGROUND OF THE INVENTION

Camera designers strive to add and improve camera features while driving the cost of cameras down. In the arena of features that make the operation of the camera simpler, the autofocusing feature has received a large amount of attention. Advances in the autofocusing art can generally be used in non-camera applications such as in the range or distance finder art. One approach that is of interest to the present invention uses one laser beam that is generally directed to the center of a camera's field of view. An object in the path of the laser beam reflects light which is received by the camera along two separate optical paths. One of the paths has a focal length that is different from the other in that when the lens is focusing the object onto the plane of the film the same object is being imaged onto photodetectors from the separate optical paths. In the most popular configuration the magnitude of the signals from the photodetectors in each path will be the same when the lens is focused. When the lens is extended in front of or behind the focal point the signals from the photodetectors will have a difference indicating the difference in size of the illumination spot on the near and far channel photodetectors. That difference is indicative of the amount of defocus and the direction of the defocus.

Other widely used autofocusing systems use either a passive or an active form of triangulation based measurements. The passive triangulation system consists of two lenses with two associated photodetector arrays on which an image of the field of view of the camera is formed. By comparing the location of the intensity distribution along the horizontal direction of each photodetector array, with respect to the center of the photodetector array, the angular displacement of the two images from the centers of their associated photodetector array is known. Since the focal length of the receiver lens is known, the object's distance can be determined from the angular displacement of the light on the photodetector array and the focal length of the receiver lens. An active system additionally incorporates a radiation source such as one or more LEDs to project one or more spots of light onto the object to be photographed. By analyzing the angular location of the return spot and knowing the focal length of the receiving lens the distance to the object can be determined. The angular position can be analyzed by using a CCD or photodetector array or by using a PSD (position sensitive diode).

A system of extremely low cost is one that projects a non-focused light beam from an LED onto the object and measures the intensity of the returned light. An estimation of the distance to the object is made based on the assumption of all objects having an average reflectivity of 18%.

SUMMARY OF THE INVENTION

The present invention is directed to overcoming one or more of the problems set forth above. Briefly summarized, according to one aspect of the present invention, there is provided an autofocus module for determining the distance of an object from a detector plane, comprising:

means for generating a beam of light that is divergent in the horizontal direction and collimated in the vertical direction said beam of light reflecting from an object in its path;

at least one pair of receiver lenses which have focal lengths that are longer and shorter than the distance to the detector plane positioned to receive the beam of light reflected from the object;

at least one pair of photodetectors each positioned at the detector plane and associated with one of said pair of receiver lenses for providing output signals indicative of the reflected intensity received from the object; and means for determining the difference in output signals from said at least one pair of photodetectors whereby said difference is a function of the distance of the object from the detector plane.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

The invention is capable of measuring distance to an object anywhere within ±5° of the device optical axis;

Due to the ease of alignment and the small number of parts the system is low in cost;

The measurement configuration is based on a differential reading of reflected light and is therefore insensitive to object reflectivity;

The autofocus module is usable in low ambient light environments due to having its own source of radiation;

The autofocus module uses anamorphic optics to generate a line of infrared light on the scene; and One embodiment of the autofocus module allows the user the choice of left, center, and right focusing zones by dividing the linear photodiodes into three segments.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1A:
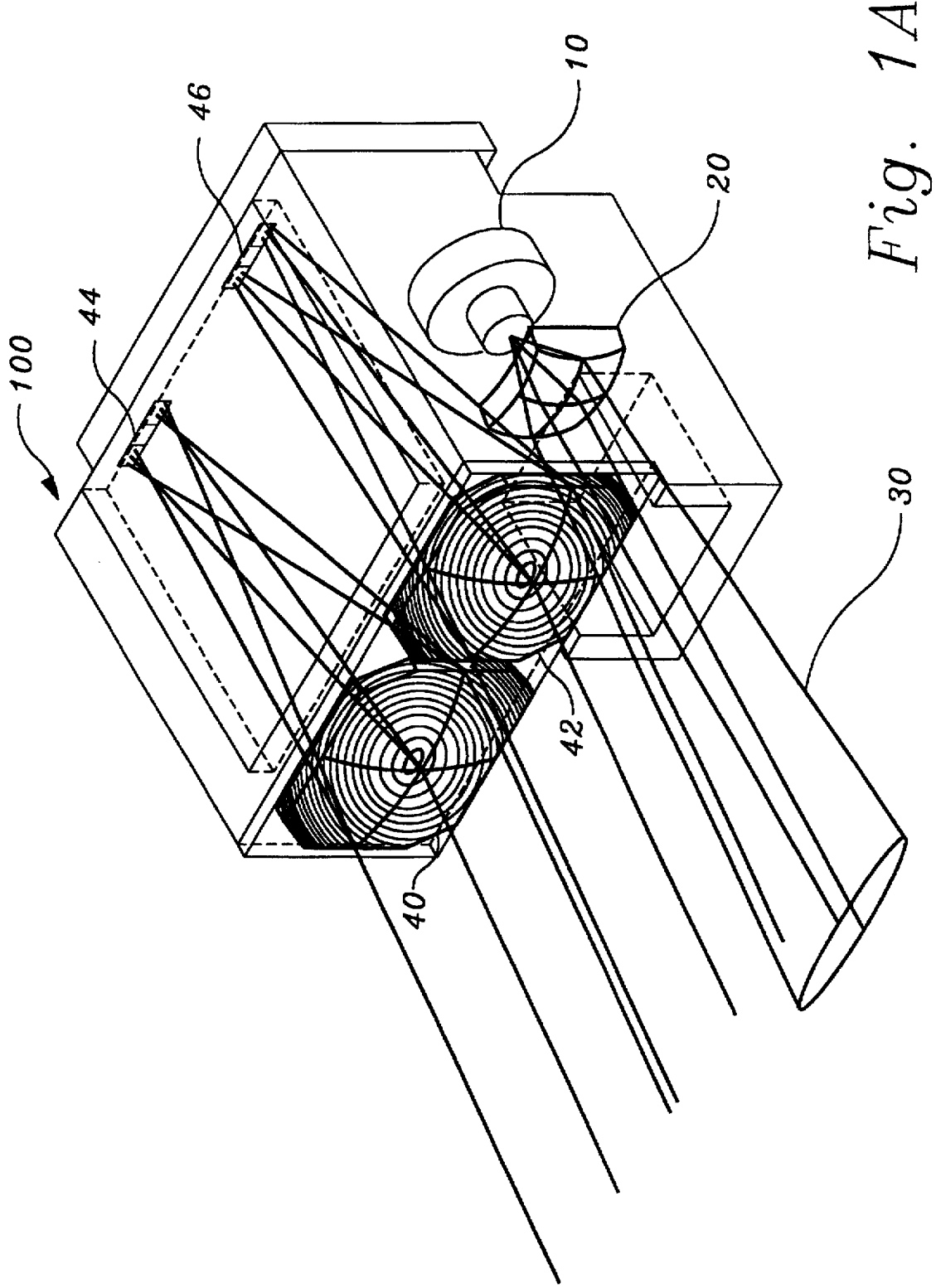
FIGS. 1A and 1B illustrate in perspective view an autofocus module, and the schematic layout of the autofocus module, respectively.
Figure 1B:
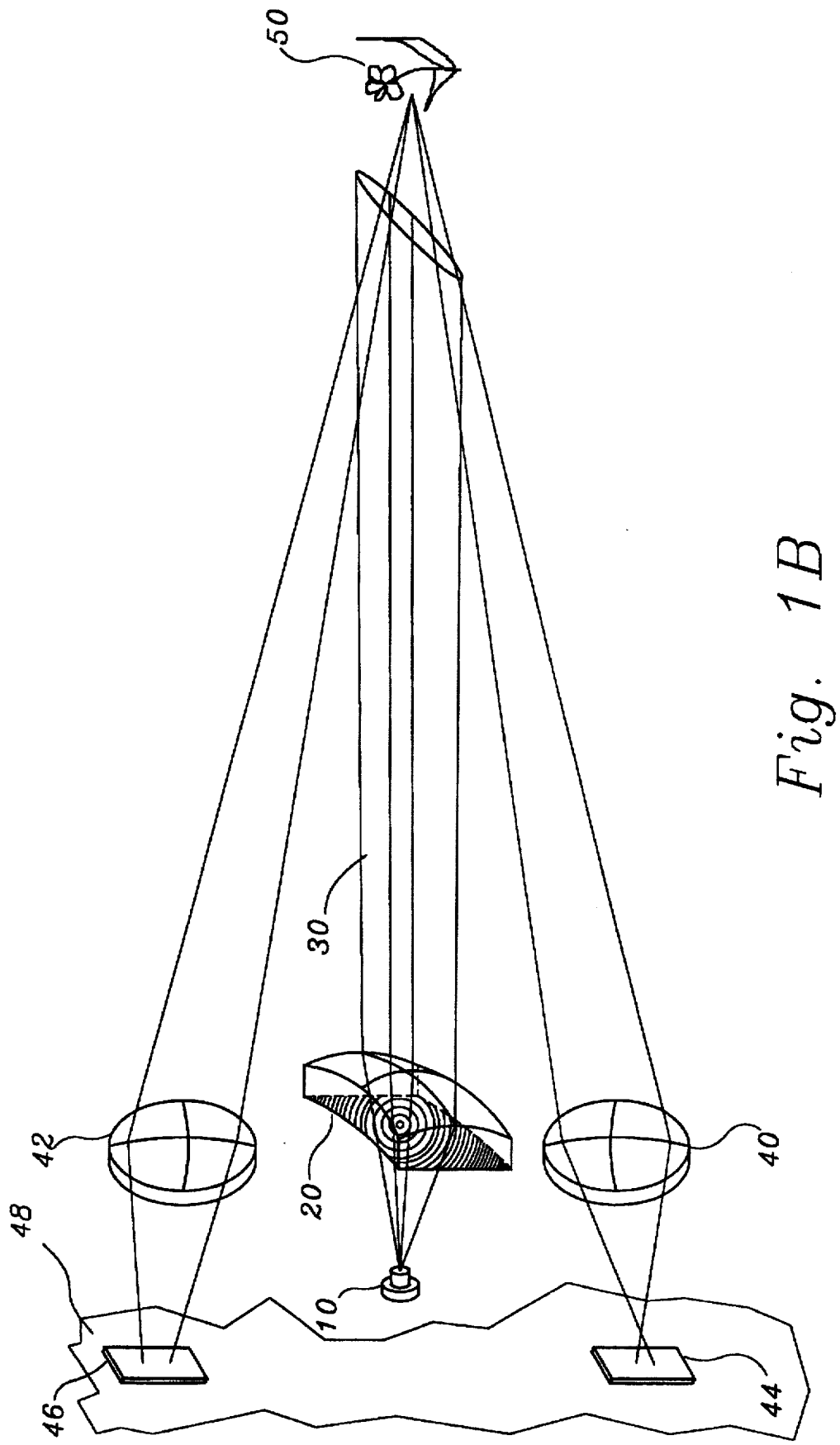

Referring to the autofocus module 100 (FIG. 1A), and the schematic layout of the autofocus module (Fig. 1B), respectively, a radiation beam 30 from a source such as a laser diode 10 is shaped into a horizontal fan of radiation by a toroidal collimator (refractive/diffractive) lens 20 which has a longer focal length in the horizontal direction than in the vertical direction. The fan of radiation 30 reflects off of an object 50 and the reflected light is imaged by two receiver lenses 40 and 42 onto rectangular photodetectors 44 and 46, respectively. The photodetectors 44 and 46 in this embodiment are positioned in the same detector plane 48. To be noted is that each of the photodetectors is formed with three sections that correspond to a right, a center, and a left section which allows the user to focus on objects in the right, center, or left portion of the field of view of the device.

The operation of the autofocus module 100 can be understood by considering the difference in size of the defocused spots from a distant object 50 from two lenses 40 and 42, with focal lengths which are shorter and longer than the distance to the near and far channel photodetectors 44 and 46, respectively. The focal lengths of the near and far channel receiver lenses 40 and 42, are chosen so that the defocused spot sizes on the detectors are equal for an object located at the desired crossover location. In camera applications the crossover location is approximately 1520 mm (5 ft). As the object moves away from the camera the images formed by the near and far channel lenses 40 and 42 will move towards the focal points of each lens. Since the near channel lens 40 focal point is already in front of the detector plane of the photodetector 44 this will result in a larger defocused spot on the detector plane while the image from the far channel moves closer to the detector plane of the photodetector 46, and a smaller spot is formed on the detector plane. Since the detector aperture (determined by the size of the phodetector's photosensitive area) is fixed and is smaller than the defocused spot, the relative differences in spot sizes will translate into differences in the photocurrent from each photodetector which can then be translated into voltage differences which are proportional to the object's distance. Alternately the photodetectors may be located at different planes with the focal length of each receiver lens being the same.

The performance of a multiple discrete spot autofocus module can be modeled accurately by the use of the paraxial ray trace equations and the resulting equation which determines the truncation ratio of photodiode area to spot size for far and near channels is $$Bf(z) := \frac{rd^2}{Ypf(z)^2} \qquad Bn(z) := \frac{rd^2}{Ypn(z)^2}$$

$$Bf(z) := \left[ \frac{rd}{\left[ rl \cdot \left( 1 - t \cdot \phi f + \frac{t}{z} \right) \right]} \right]^2$$

$$Bn(z) := \left[ \frac{rd}{\left[ rl \cdot \left( 1 - t \cdot \phi n + \frac{t}{z} \right) \right]} \right]^2$$

where
- Ypf, Ypn=height of marginal ray on photodetector plane
- Bf, Bn=ratio of photodiode area to defocused spot size
- rd=radius of photodiode aperture
- t=distance from receiver lens to detector plane
- rl=radius of receiver lens
- z=object distance
- $\phi n$, $\phi f$=power of near and far receiver lenses The difference of truncation ratios provides an output signal that is proportional to the object's distance according to the following formula:

$$DB(z) := \left[ \frac{rd}{\left[ rl \cdot \left( 1 - t \cdot \phi f + \frac{t}{z} \right) \right]} \right]^2 - \left[ \frac{rd}{\left[ rl \cdot \left( 1 - t \cdot \phi n + \frac{t}{z} \right) \right]} \right]^2$$

This calculation assumes a nearly uniform intensity distribution over the defocused spot and assumes that the extent of the defocused spot is limited by the marginal ray (ray at the edge of the lens aperture). In the present invention one needs to consider the fact that the extent of the reflected light will vary depending on the width of the object 50. Since most of the truncation of the horizontal beam occurs in the vertical rather than the horizontal direction, the mode of operation for the present invention is similar to a three discrete spot autofocus module disclosed in U.S. Pat. No. 5,569,904, entitled "Multispot Autofocus System Usable With An Image Recording Apparatus," by Mark M. Meyers.

By using the horizontal fan of radiation any object near the center of the field of view will provide a distance signal. The derived distance signal is usable, in a first embodiment, to drive the image capture lens to a focused position or in another embodiment the distance signal may be used to drive an indicator to provide a visual readout of distance such as would be required in a rangefinder device.

Figure 2A:
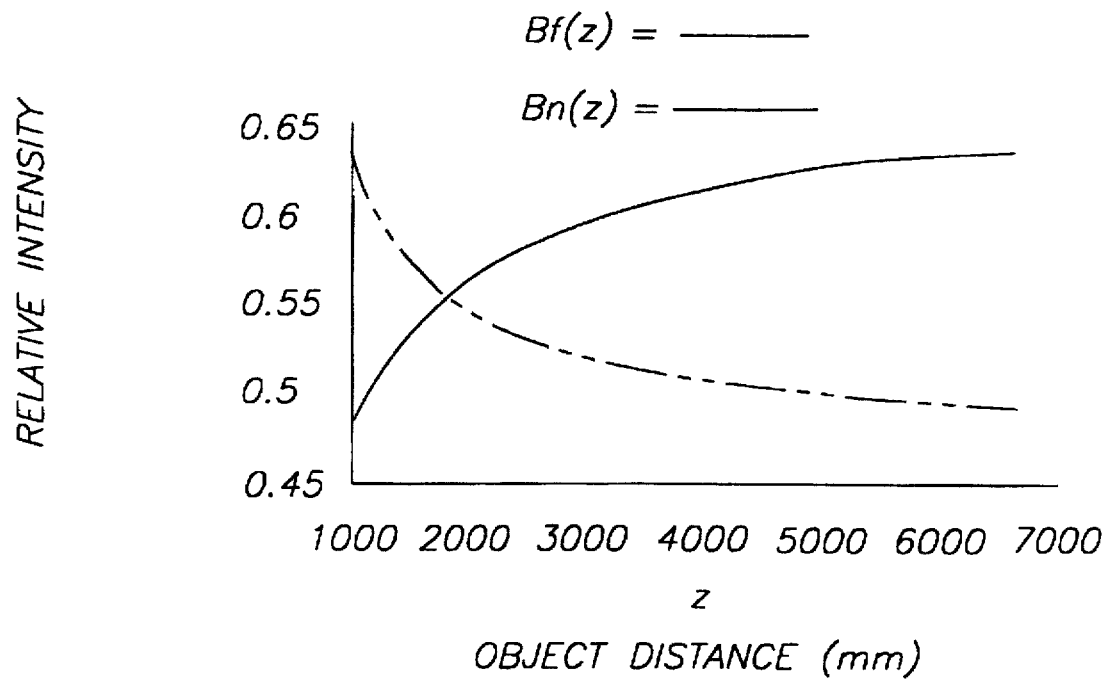
FIGS. 2A and 2B are curves illustrating the relative truncation of the near and far channels photocurrent, and a voltage difference between the near and the far channels, respectively, as a function of an object distance.
Figure 2B:
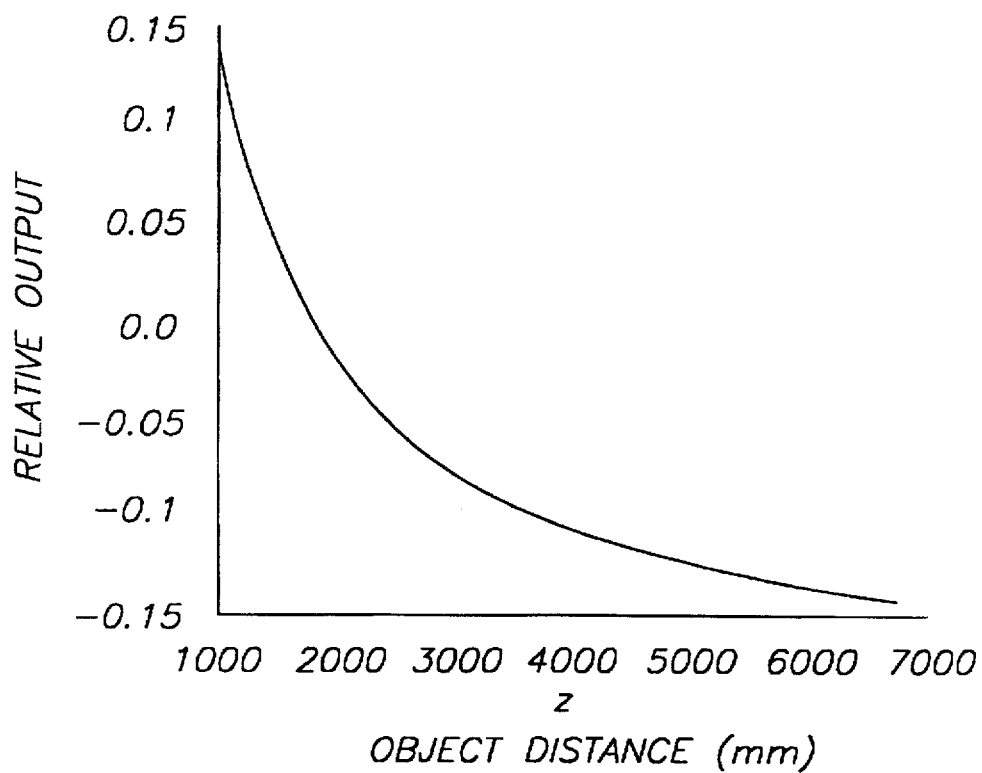

The FIG. 2A curve Bf, represents the output signal strength on the far channel as the object distance varies from 1,000 to approximately 7,000 mm. Likewise the curve Bn represents the object signal strength on the near channel as the object distance varies over the same range. The difference between the two channels is represented in FIG. 2B as an output signal that is proportional to object distance.

Figure 3:
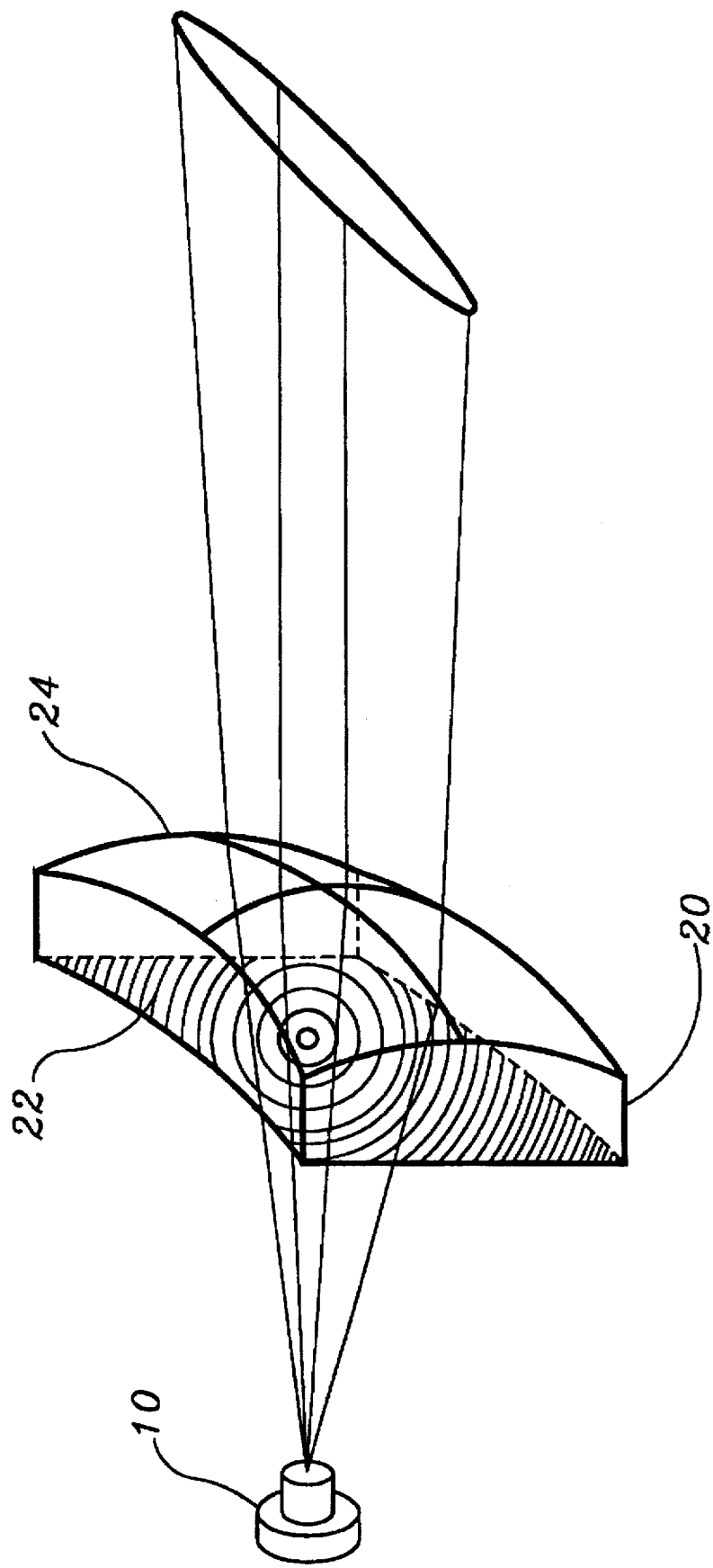
FIG. 3 illustrates a toroidal collimating lens illuminated by a laser diode beam.

Referring to FIG. 3, the laser diode 10 emits an elliptical beam which is incident on the toroidal collimator lens 20. The rear surface 22 of the lens 20 is a spherical surface with a diffractive profile for achromatizing the toroidal collimator lens 20 over the wavelength band of interest. The front surface 24 of the lens 20 is a toroid which collimates the beam 30 in the vertical direction and allows the beam to diverge in the horizontal direction by approximately ±5 degrees. The radii of curvature of the front surface 24 in the vertical direction is shorter than the radius of curvature in the horizontal direction. Additionally, an aspheric profile may be imparted to one or both of the surface curvatures on surface 24. The specification data for forming lens 20 is set out in the table bellow:

| Surface No. | Radius | Thickness | Glass |
|---|---|---|---|
| Laser | | 3.67 | Air |
| 1 | −32.15 | 2.3 | Styrene |
| | | Diffractive | $DF1 = -2.1 \times 10^{-2}$ |
| | | Coeffi- | $DF2 = 2.6 \times 10^{-3}$ |
| | | cients | $DF3 = -1.5 \times 10^{-4}$ |
| | | | $DF4 = 4.6 \times 10^{-5}$ |
| | | | $DF5 = -6.8 \times 10^{-6}$ |
| 2 Aperture Stop | $R_x = -3.18$ | 1000.0 | Air |
| | $R_y = -3.72$ | | |
| Aspheric | $AD_x = 7.85 \times 10^{-2}$ | | |
| Coefficients | $AE_x = 2.43 \times 10^{-2}$ | | |
| | $AF_x = -3.35 \times 10^{-3}$ | | |
| | $AG_x = 4.28 \times 10^{-5}$ | | |
| Object | | | Air |

Figure 4A:
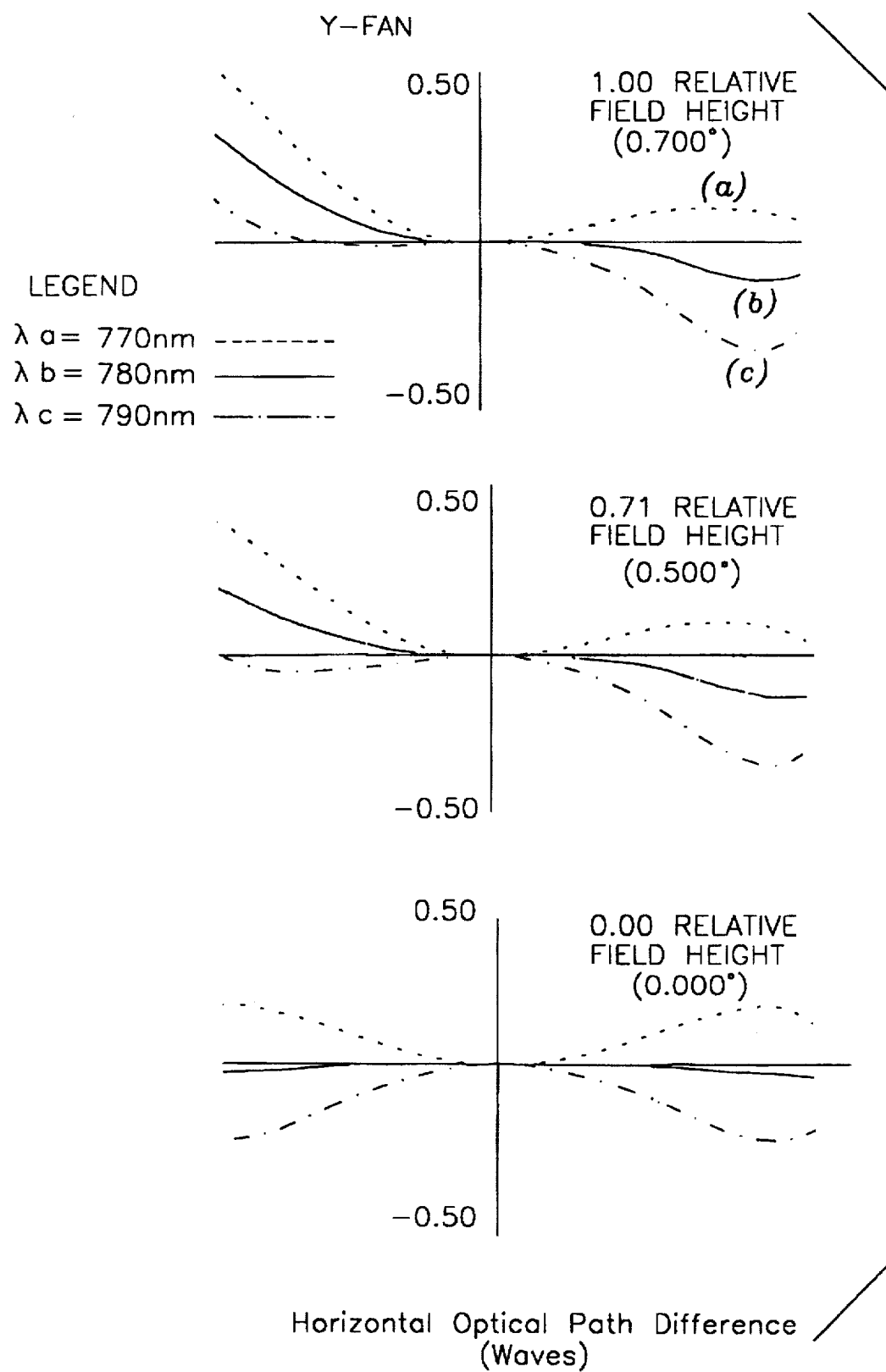
FIGS. 4A and 4B illustrate the ray aberration curves for the vertical and the horizontal direction of the toroidal laser diode collimator of FIG. 3.
Figure 4B:
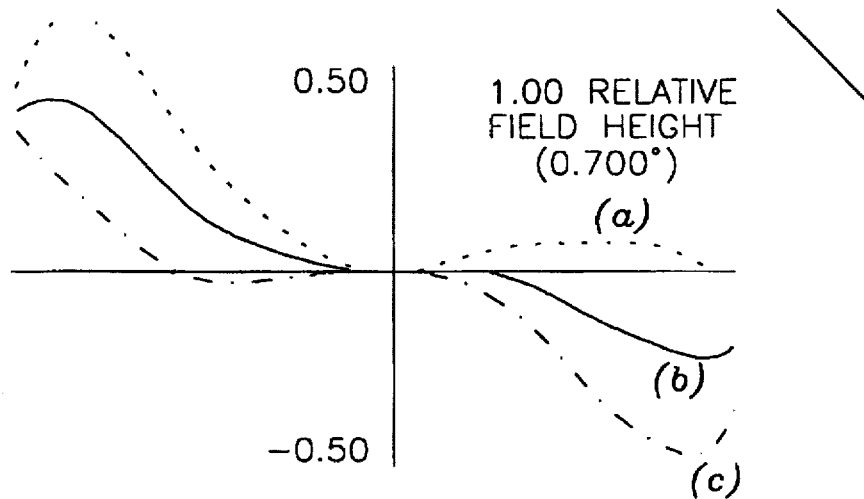
Figure 4B:
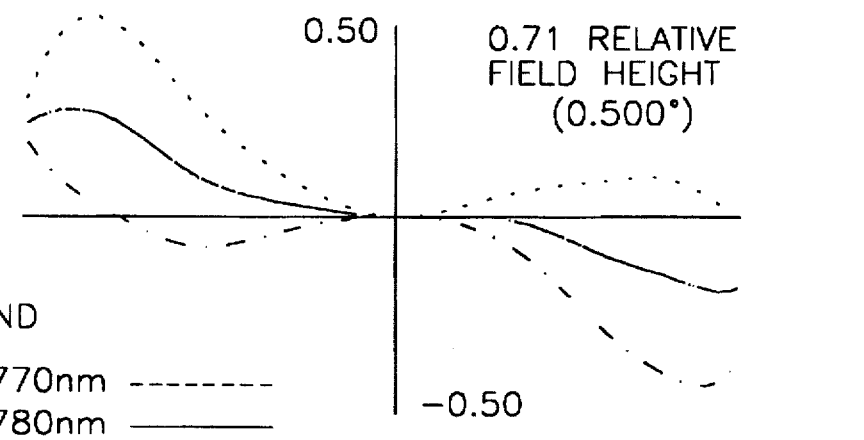
Figure 4B:
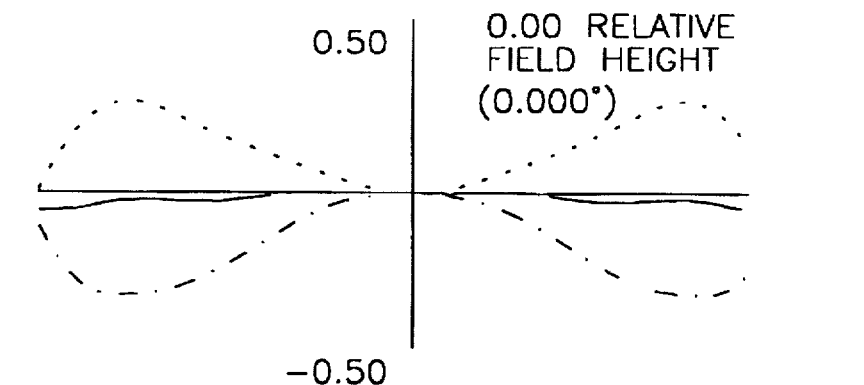

FIGS. 4A and 4B show the ray aberration curves for the vertical and horizontal directions of the lens 20, respectively. As can be seen, the aberrations are generally less than ½ wave of optical path difference. In addition, one can see that the lens performs reasonably over a band of ±10 nm around the central wavelength (780 nm).

Figure 5A:
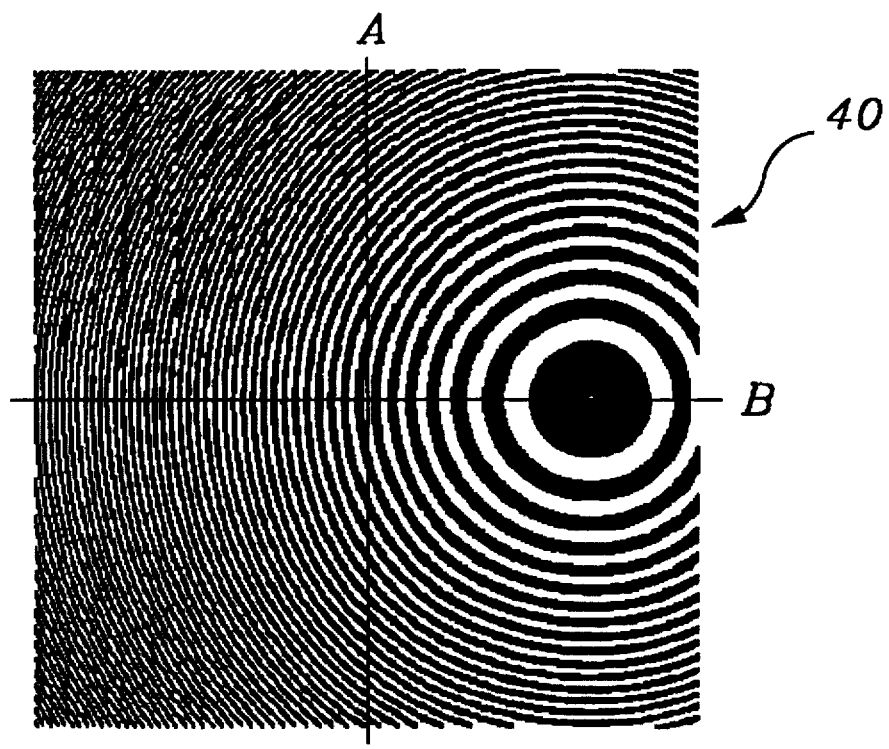
FIGS. 5A and 5B illustrates the locations of the maxima of the diffractive phase function for the near and the far channel receiver lenses, respectively.

FIG. 5A shows the location of diffractive profile maxima for the near channel receiver lens 40. One can see that the center of the diffractive profile does not occur at the center of clear aperture (intersection of axis A and B). This feature allows the light incident on the receiver lens 40 to be dispersed angularly as a function of wavelength. This in turn allows the laser illumination to be incident on the center of the photodetector while visible, and far infrared light from the object, is deflected outside of the photodetector aperture (see FIG. 6). This receiver lens 40 has a focal length of 14.7 mm and an f# of 1.8. The specification data for lens 40 is listed in the following table:

| Surface No. | Radius | Thickness | Glass |
|---|---|---|---|
| Object | | Infinity | Air |
| 1 Aperture Stop | Infinity | 1.0 | Acrylic |
| Diffractive | $DF1 = -3.4 \times 10^{-2}$ | | |
| Coefficients | $DF2 = 3.2 \times 10^{-5}$ | | |
| | $DF3 = 3.7 \times 10^{-6}$ | | |
| Element Decenter | $DF4 = -3.5 \times 10^{-7}$ | | |
| DC = 1.3 | $DF5 = 8.8 \times 10^{-9}$ | | |
| | | 14.0 | Air |
| Image | | | Air |

Figure 5B:
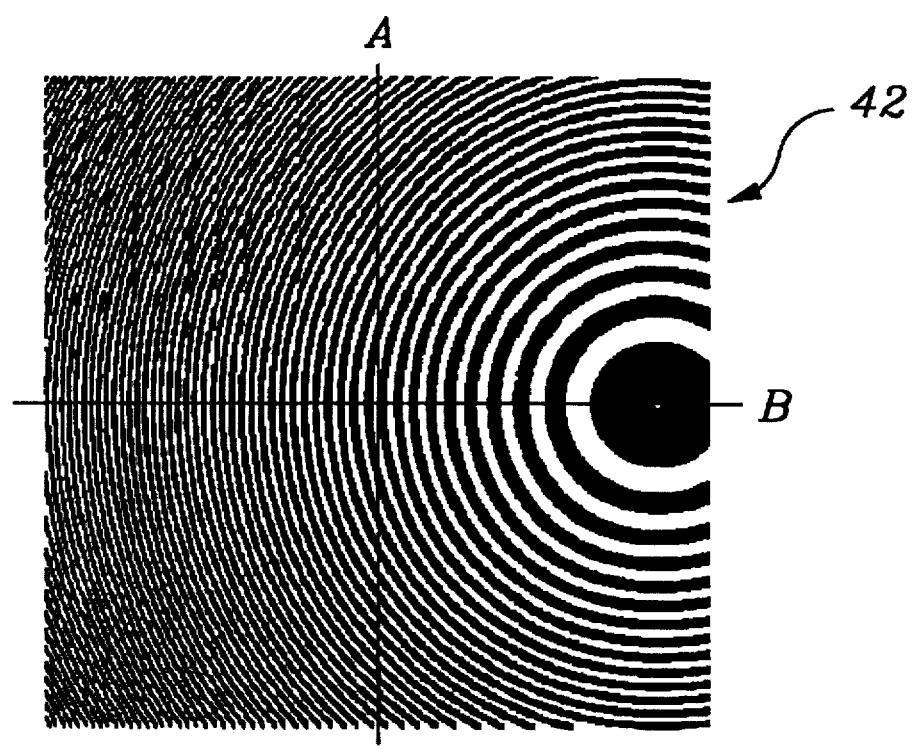

FIG. 5B shows the location of diffractive profile maxima for the far channel receiver lens 42 which is also decentered and which has a focal length of 18.1 mm and an f# of 2.1. The specification data for lens 42 is listed in the following table:

| Surface No. | Radius | Thickness | Glass |
|---|---|---|---|
| Object | | Infinity | Air |
| 1 Aperture Stop | | 1.0 | Acrylic |
| Diffractive | $DF1 = -2.8 \times 10^{-2}$ | | |
| Coefficients | $DF2 = 8.8 \times 10^{-5}$ | | |
| | $DF3 = -7.0 \times 10^{-6}$ | | |
| Element Decenter | $DF4 = -3.2 \times 10^{-7}$ | | |
| DC = 1.6 | $DF5 = -5.7 \times 10^{-9}$ | | |
| | | 17.5 | Air |
| Image | | | Air |

Figure 6:
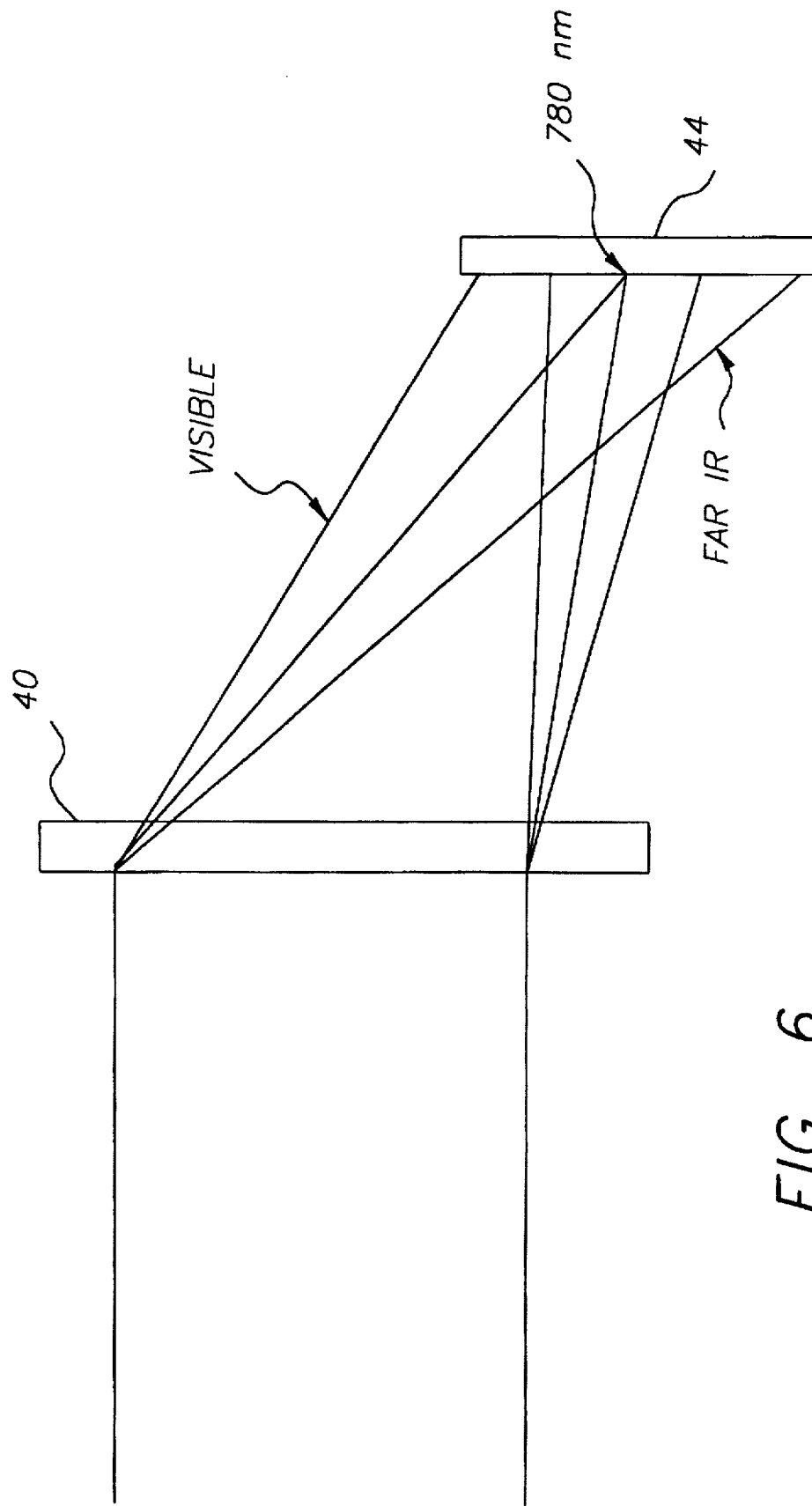
FIG. 6 illustrates the dispersion of visible and infrared light along a side view of a diffractive receiver lens.

FIG. 6 consists of a side view of the near channel receiver lens 40 showing the diffraction of infrared laser light (at 780 nm) into the aperture of the photodetector 44. Visible light or wavelengths from 400 to 700 nm is incident on the detector plane above the photodetector while far infrared light is diffracted below the photodetector. In this fashion the decentered diffractive element acts as a spectral filter to disperse light from the object not emitted by the laser diode from the aperture of the photodetector.

Figure 7:
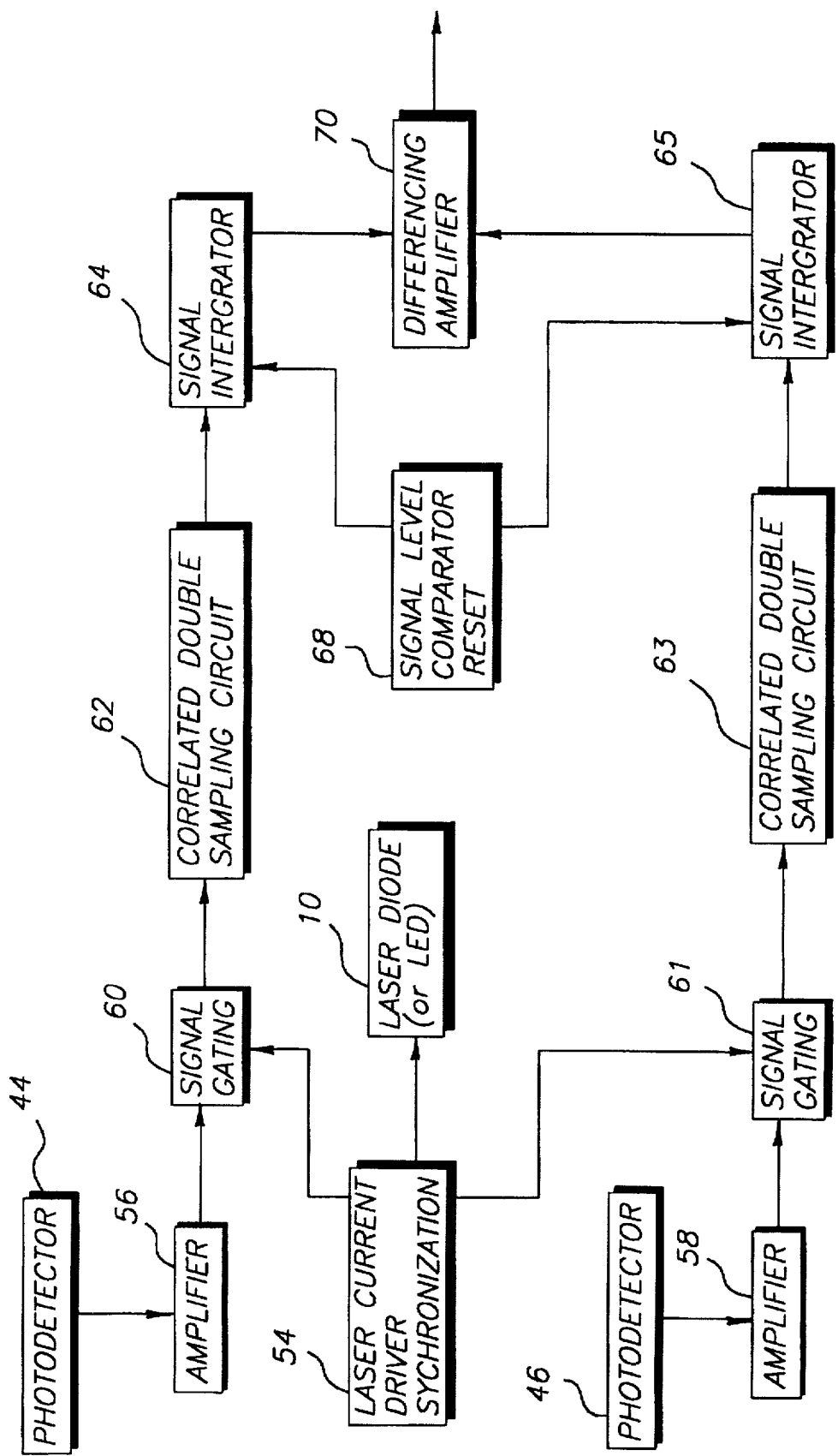
FIG. 7 is a block diagram of an electronic circuit that may be used with the autofocus module of FIG. 1.

Referring now to FIG. 7, a block diagram of an electrical circuit that may be used with the autofocus module 100 is depicted. A laser current driver 54 powers and modulates the laser diode 10 at a frequency of five kilohertz (5 khz). The output signals from the photodetectors 44 and 46 are amplified by amplifiers 56 and 58, respectively, and are processed in separate channels for comparison. Using the first channel for this description, the amplified signal of photodetector 44 is gated at 60 to a correlated double sampling circuit 62 and then forwarded to an integrator 64. Gating is controlled by a synchronization signal from the laser current driver 54. The integrating period of integrator 62 is matched to the "on" period of the laser diode 10. During the "off" period of the laser diode the signal from the photodetector 44 is inverted and integrated in the negative sense. This allows for the subtraction of photodetector dark current, ambient DC light, flicker, and 1/f noise. This embodiment includes the advantages of correlated double sampling for each signal channel. Noise is reduced, and the signal-to-noise ratio increased by integrating the amplified photodetector signal only when the laser diode 10 is "on".

Integration of the amplified signal continues over many pulses of laser operation until the integrated value in either channel reaches some predetermined level optimal for processing, such as three volts, as determined by a comparator 68. At the same time, the integrated signal from the second channel, 46, 58, 61, 63, and 65, is sampled and subtracted by a differencing stage 70.

The output signal representing the direction and magnitude of focus adjustment required for a camera objective lens is independent of the absolute illumination from the laser and the reflectivity of the subject. The output signal can be analog or digital. If the output signal is digitized, its application in a microprocessor based system is simplified. The microprocessor can then direct a motor to move the camera objective lens to its in-focus position.

The invention has been described with reference to a preferred embodiment; However, it will be appreciated that variations and modifications can be effected by a person of ordinary skill in the art without departing from the scope of the invention.

| PARTS LIST: | |
|---|---|
| 10 | laser diode |
| 20 | toroidal collimator lens |
| 22 | rear surface toroidal collimator lens |
| 24 | front surface of toroidal collimator lens |
| 30 | beam |
| 40 | near channel receiver lens |
| 42 | far channel receiver lens |
| 44 | near channel photodetector |
| 46 | far channel photodetector |
| 48 | detector plane |
| 50 | object |
| 54 | laser current driver |
| 56 | amplifier |
| 58 | amplifier |
| 60 | gating |
| 61 | gating |
| 62 | correlated double sampling |
| 63 | correlated double sampling |
| 64 | integrator |
| 65 | integrator |
| 68 | comparator |

-continued

| PARTS LIST: | |
|---|---|
| 70 | differencing stage |
| 100 | autofocus module |

I claim:

1. An autofocus module for determining the distance of an object from a detector plane, comprising:

means for generating a beam of light that is divergent in the horizontal direction and collimated in the vertical direction said beam of light reflecting from an object in its path;

at least one pair of receiver lenses which have focal lengths that are longer and shorter than the distance to the detector plane positioned to receive the beam of light reflected from the object;

at least one pair of photodetectors each positioned at the detector plane and associated with one of said pair of receiver lenses for providing output signals indicative of the reflected intensity received from the object; and means for determining the difference in output signals from said at least one pair of photodetectors whereby said difference is a function of the distance of the object from the detector plane.

2. An autofocus module, according to claim 1 wherein said means for generating a beam of light is comprised of:

a semiconductor light source for providing a collimated light beam; and a toroidal lens having a longer focal length in the horizontal direction than in the vertical direction positioned in the path of said collimated light beam.

3. An autofocus module, according to claim 2 wherein said toroidal lens has a rear surface that is spherical with a diffractive profile.

4. An autofocus module, according to claim 2 wherein said toroidal lens has a front surface that is a toroid which collimates the generated beam in the vertical direction and allows the beam to diverge approximately ±5 degrees in the horizontal direction.

5. An autofocus module according to claim 2 wherein said toroidal lens has a front toroidal surface with a radius of curvature in the vertical direction being shorter than the radius of curvature in the horizontal direction.

6. An autofocus module according to claim 2 wherein said toroidal surface further has an aspheric profile.

7. An autofocus module according to claim 1 wherein said at least one pair of receiver lenses is refractive.

8. An autofocus module according to claim 1 wherein said at least one pair of receiver lenses is diffractive.

9. An autofocus module according to claim 1 wherein said at least one pair of receiver lenses is formed as a decentered diffractive.

10. An autofocus module, comprising:

means for generating a beam of light that is divergent in the horizontal direction and collimated in the vertical direction;

at least one pair of receiver lenses each having the same focal lengths;

at least one pair of photodetectors each positioned nearer and further than the focal lengths of a respective receiver lens for providing signals indicative of the reflected intensity of the generated beam from an object; and means for determining the difference in output signals from said at least one pair of photodetectors whereby said difference is a function of the distance of the object from the autofocus module.

11. An autofocus module, according to claim 10 wherein said means for generating a beam of light is comprised of:

a semiconductor light source for providing a collimated light beam; and a toroidal lens having a longer focal length in the horizontal direction than in the vertical direction positioned in the path of said collimated light beam.

12. An autofocus module, according to claim 11 wherein said toroidal lens has a rear surface that is spherical with a diffractive profile.

13. An autofocus module, according to claim 11 wherein said toroidal lens has a front surface that is a toroid which collimates the generated beam in the vertical direction and allows the beam to diverge approximately ±5 degrees in the horizontal direction.

14. An autofocus module according to claim 11 wherein said toroidal lens has a front toroidal surface with a radius of curvature in the vertical direction being shorter than the radius of curvature in the horizontal direction.

15. An autofocus module according to claim 11 wherein said toroidal surface further has an aspheric profile.

16. An autofocus module according to claim 10 wherein said at least one pair of receiver lenses is refractive.

17. An autofocus module according to claim 10 wherein said at least one pair of receiver lenses is diffractive.

18. An autofocus module according to claim 10 wherein said at least one pair of receiver lenses is formed as a decentered diffractive.

* * * * *